United States Patent [19]

Hudak

[11] 4,389,422

[45] Jun. 21, 1983

[54] METHOD FOR PRODUCING AROMATIZED MICROPOROUS SUBSTRATES

[75] Inventor: Stephen F. Hudak, Croton-on-Hudson, N.Y.

[73] Assignee: General Foods Corporation, White Plains, N.Y.

[21] Appl. No.: 303,458

[22] Filed: Sep. 18, 1981

Related U.S. Application Data

[63] Continuation of Ser. No. 139,058, Apr. 10, 1980, abandoned.

[51] Int. Cl.$^3$ .................. A23L 1/22; A23L 1/222; A23F 3/40; A23F 5/46
[52] U.S. Cl. .................................. 426/388; 34/9; 426/424; 426/594; 426/596; 426/599; 426/650; 426/651; 426/426
[58] Field of Search .............. 426/424, 594, 596, 599, 426/650, 651, 388, 426; 34/9

[56] References Cited

U.S. PATENT DOCUMENTS 2,929,150  3/1960  Johnston .................................. 34/9
3,298,109  1/1967  Bohrer .................................... 34/9

OTHER PUBLICATIONS

Spicer, Advances in Preconcentration and Dehydration of Foods, 1974, John Wiley & Son: New York, pp. 467–473.

*Primary Examiner*—Joseph M. Golian
*Attorney, Agent, or Firm*—Thomas R. Savoie; Daniel J. Donovan; Joseph T. Harcarik

[57] ABSTRACT

Microporous particles of vegetable material are obtained by spraying an aqueous solution of a vegetable material into an anhydrous solvent, such as ethanol or by boiling particles of spray dried vegetable material in these solvents.

6 Claims, No Drawings

METHOD FOR PRODUCING AROMATIZED MICROPOROUS SUBSTRATES

BACKGROUND OF THE INVENTION

This application is a continuation of application Ser. No. 139,058, filed Apr. 10, 1980 and now abandoned, said continuation application being related to Ser. No. 950,337 filed Oct. 10, 1978 in the names of both Stephen F. Hudak and Fouad Z. Saleeb, and now abandoned in favor of continuation application Ser. No. 189,515 filed Sept. 22, 1980.

Soluble beverage powders such as spray dried coffee or tea products are relatively devoid of aroma as compared to their source or parent material—namely, roasted and ground coffee and fermented tea leaves. The same low aroma situation exists with dried fruit juices, such as freeze-dried orange juice, as compared to natural fruit from which the juice is obtained. Low aroma intensity also exists in certain types of roasted coffee material such as most decaffeinated coffees and the compressed roasted coffee materials described in U.S. Pat. Nos. 1,903,362 to McKinnis, 3,615,667 to Joffe and 3,801,716 to Mahlmann et al. These low-aroma beverage products have an initially low quantity of aroma, such that upon the initial opening of the product by the consumer only low aroma impact is detected, and whatever amount of aroma is present in the product is rapidly given up after initial opening of the container, such that subsequent openings of the container during a typical in-use cycle for the product evolve little or no aroma.

It should be noted that the terms "coffee product" and/or "tea product" as used in this invention is meant to refer to not only those materials consisting of 100% coffee and/or tea but also to substitute or extended coffees or teas which may contain roasted grain, chicory and/or other vegetable materials alone or in combination with coffee and/or tea.

To date most efforts to add natural aroma to food products have focused on the addition of roasted coffee aroma to soluble coffees such as spray or freeze-dried coffee. Understandably then the thrust of the present invention is in the area of aromatizing soluble coffee products; however, the application of this invention for the aromatization of other food products is contemplated.

At the present time, virtually all commercial soluble coffees are combined with coffee oil such as by spraying the soluble coffee prior to packaging with either a pure or an aroma-enriched coffee oil. In this manner the soluble coffee material will have an aroma more akin to non-decaffeinated roasted and ground coffee. The addition of oil is usually effected by the well-known oil plating technique (shown in U.S. Pat. No. 3,148,070 to Mishkin et al.) or by oil injection (shown in U.S. Pat. No. 3,769,032 to Lubsen et al.).

Coffee oil with or without added aromas has been the preferred medium employed to aromatize coffee material since such products could still be designated as being pure coffee; however, techniques developed for the production of coffee oil (see Sivetz, Coffee Processing Technology, Vol. 2, Avi Publishing Company, 1963, pages 21 to 30) such as solvent-extracting or expelling coffee oil from roasted coffee are not particularly desirable since the manufacturer is left with either solvent-containing roasted coffee or expelled cake, both of which must be either further processed or discarded.

The addition of oil to a coffee product has also proven troublesome in that, undesirably, oil droplets can appear on the surface of the liquid beverage prepared from the oil-containing product. Thus, it would be advantageous if processes for aromatizing coffee products were developed which employed all coffee or other vegetable materials, but which did not require the production or use of coffee oil or other glyceride material.

A method of aromatizing food products which does not have to rely on synthetic materials or chemical modification of natural materials would have applications in the food industry in addition to coffee and tea products. Powdered fruit juices, powdered fruit-flavored beverage concentrates and gelatin dessert mixes are but some of the possible applications. The use of expressed aromatic oils such as orange oil and lemon oil has been practiced in the food art, but the instability of these oils has limited their use. If the aromatics contained in either these oils or elsewhere in a foodstuff material were capable of being held in a stable manner within natural vegetable materials, natural aromas could be incorporated into a multitude of food products.

While the majority of the description presented herein relates to aromatizing coffee products, such a presentation is for convenience of description only and the invention is not meant to be limited thereby.

DESCRIPTION OF THE INVENTION

Water-soluble particles of edible materials are obtained by drying aqueous solutions of vegetable materials such as coffee, tea, chicory, fruits, and the like. These particles are prepared in such a manner that the particles have an average (basis distribution of % by weight) diameter which is below 200 microns ($\mu$) preferably below 150$\mu$, usually between about 50$\mu$, and possess a microporous structure containing micropores having a most probable radius of less than 150 angstroms (Å) preferably less than about 110 Å, more preferably less than 50 Å. A most probable radius of between 10 and 35 Å has been found to be most preferred for this invention. Micropores smaller than about 15 Å while thought to be desirable for purposes of this invention have not been found to be readily attainable and is seen to constitute a practical lower limit for the most probable radius parameter. A pore radius of less than about 3 Å is not desirable since such a small size would exclude molecules of aromatic compounds sought to be fixed within the microporous structure.

The fine pore structure of the porous particles of this invention was determined from analysis of the adsorption-desorption isotherms of carbon dioxide gas on these particles at $-78°$ C. A standard all-glass volumetric gas adsorption apparatus was used following the procedures recognized by those skilled in the field of surface chemistry (Brunauer, S., "The Adsorption of Gases and Vapors" Vol. 1, Princeton Univ. Press, 1945). Normally one determines the adsorption isotherms first, by measuring the amounts of $CO_2$ adsorbed at various but successively increasing equilibrium pressures, and then reduces the pressure to obtain the desorption branch of the isotherm.

The desorption isotherms are usually the result of ordinary multilayer adsorption and condensation in pores, in which case the Kelvin equation, which evaluates the lowering of the adsorbate ($CO_2$) vapor pressure due to the concavity of the liquid meniscus in the pore, can be applied. In its simple form and assuming a complete wetting of the surface (zero contact angle) the pore radius (r) is given by $$r = \frac{-2\sigma V}{RT \ln P_d/P_o}$$

where o is the surface tension of liquid sorbate ($CO_2$), V is its molar volume, $P_d$ is the pressure at the desorption branch of the isotherm and $P_o$ is the saturated vapor pressure (760 mm Hg for $CO_2$ at −78° C.). The Kelvin equation shows that there is a logarithmic relationship between the pore radius and the relative pressure ($P_d/P_o$). Narrower pores fill at lower relative pressures, wider pores at higher pressures, and the entire pore space is filled at the saturation pressure. Further refinements of the Kelvin equation have to be applied to correct for gas adsorption which occurs simultaneously with gas condensation (Barrett, E. P., L. G. Joyner, P. P. Halenda; J. Amer. Chem. Soc. 73, 373 (1951). Computation is then performed to obtain the relative pressures and hence gas volumes (v) adsorbed corresponding to selected pore radii(r). Plots of $$\frac{\Delta V}{\Delta r} \frac{(cc/g)}{(Å)}$$

vs r (Å) provide pore volume distribution curves. The shape of these distribution curves reflect the uniformity or the spread of pores of different sizes in a given sample. As will be recognized by those skilled in the art, the pore size distribution within a given porous material generally follows a bell-shaped curve distribution pattern, and the term "most probable radius" is meant to refer to the radius corresponding to the top of the pore volume distribution curve.

The aqueous solutions used to prepare the dry particles will usually be obtained by means of an aqueous extraction of a vegetable material such as roasted coffee or fermented tea, or by expressing a juice from a vegetable material such as oranges, apples, grapes and the like.

Various techniques such as those hereinafter set forth will be available for producing particles having the desired microporous structure. Conventional spray drying yields dry particles which do not possess a micorporous structure. Conventional freeze drying yields particles wherein the most probable pore radius is well in excess of 10,000 Å. Pores below 150 Å are necessary in order to trap volatile aromatic compounds, such as those found in coffee and tea aroma, within the microporous structure of the dry particle. The entrapment of aromatics by the dry particles of this invention is believed to be a result of both adsorption and more importantly, capillary condensation (i.e., the liquefaction of vapors in pores). The aromatics are held within microporous structure without the necessity of any coating on the surface of the particles. A small percentage of these aromatics will, however, be released as a result of the slight partial pressure exerted by the trapped aromatics. The mechanism of capillary condensation will not occur in pores of excessive size where surface coating of the particles will be necessary to retain aromatics.

The dry porous particles produced in accordance with this invention are, after being contacted with desirable aromatics, used to provide headspace aroma for packaged low-aroma food products such as the aforementioned soluble coffee or tea products. These particles will be combined with the food product at a preferred level by weight of from 0.1% to 2%, most preferably from about 0.2% to 1%. Typically the dry aromatized soluble particles of this invention will be merely blended with a dry, low-aroma, powdered food product.

Several methods have been identified for producing dry soluble particles of edible material obtained from aqueous solutions of vegetable materials such that the resulting dry particles are below 200µ in diameter and contain a porous structure wherein the most probable pore radius is below 150 Å.

Spraying of an aqueous solution, preferably having a solids content less than 40% by weight, typically 25% to 35% by weight; into a cryogenic fluid having a temperature below −100° C., preferably liquid nitrogen, and subsequently freeze drying the frozen particles of solution produces dry microporous particles having a most probable pore radius of less than 50 Å. The spray should produce particles having an average particle size of below 200µ in diameter so that the entire particle will be instantaneously frozen on contact with the cryogenic fluid. It is believed that instantaneous freezing will result in the formation of only minute ice crystals throughout the particle. Should the spray droplets exceed 200µ in average diameter then, even at liquid nitrogen temperature the frozen particle will possess the desirably minute ice crystals only at its surface and not throughout its structure. Sublimation of these minute ice crystals is seen to yield the desirable microporous structure of this invention. Use of a cryogenic fluid having a temperature above −100° C. has not been found to produce a most probable pore radius of less than 150 Å regardless of the diameter of the spray droplets.

Another method for producing the dry microporous particles is to spray the aqueous solution into a anhydrous organic solvent, such as 100% ethanol, which will both dehydrate the extract and form porous spheres of soluble solids. Soluble coffee particles prepared in this manner have been found to possess a most probable pore radius of less than 50 Å. It is also possible to begin with ground spray dried particles, such as soluble coffee, and boil these particles in an edible organic solvent such as ethanol, preferably after grinding, in order to etch the surface of the particles and produce a desirably porous structure. Again, it will be desirable to produce or utilize particles which have an average diameter below 200µ in order to provide sufficient surface area for the solvent to etch such that a sufficient number of desirable micropores are produced.

The microporous particles produced according to this invention could entrap volatile aromatic compounds up to about 2% by weight. In actual practice amounts of aromatics in excess of 1% are difficult to obtain. Entrapment of aromatics at a level of less than about 0.1% by weight would require the addition of aromatized particles to the soluble food product at a level of 5% or more. It will usually be preferred to add the aromatized particles at a level of less than 2% by weight. Preferably the aromatized particles of this invention will contain aromatics at a level of 0.2% or more, typically about 0.5%.

The method of contacting the porous particles with aromatics for the purpose of entrapping aroma within the particles can be many and varied. The use of high pressure and/or low particle temperatures may be employed in order to maximize pick-up of aroma or shorten the period of time required to achieve a desired level of aromatization; however, such conditions are not required. It will be desirable, however, to minimize the amount of moisture which comes into contact with the soluble porous particles both before, during and after aromatization. Suitable condensation, vaporization, sweeping and/or other separation techniques may be employed to separate the moisture and aromatics contained in aroma-bearing gas streams, aroma frosts or liquid aroma condensates. It may also be desirable to separate aromatics from any carrier gas (e.g. $CO_2$ in which they are entrained. Among the techniques useful for adsorbing aromatics onto the porous substrates are: (1) placing both the porous particles and a condensed $CO_2$ aroma frost well-mixed in a vented vessel, preferably above $-40°$ C., and permitting the $CO_2$ portion of the frost to sublime off, (2) enclosing both the adsorbent and a condensed aroma frost in one or two connected pressure vessels and then raising the temperature within the frost containing vessel to vaporize the frost and provide an elevated pressure, (3) combining a highly concentrated aqueous aroma condensate with the porous particles at a level at which it does not unduly moisten the particles, (4) condensing aromatics onto chilled porous particles, (5) passing a stream of aroma-bearing, low-moisture gas through a bed or column of porous particles.

The aromatics which may be used for this invention may be derived from any of the many sources well-known to those skilled in the art. Depending on the method of contact to be employed, the aromas may be present as a component of a gas, a liquid condensate or a condensed frost. Among the aromas which may be used are coffee oil aromas, as described in U.S. Pat. No. 2,947,634 to Feldman et al., aromas obtained during the roasting of green coffee, as described in U.S. Pat. No. 2,156,212 to Wendt, aromas obtained during the grinding of roasted coffee, as described in U.S. Pat. No. 3,021,218 to Clinton et al., steam-distilled volatile aromas obtained from roasted and ground coffee, as described in U.S. Pat. Nos. 2,562,206 to Nutting, 3,132,947 to Mahlmann, 3,244,521 to Clinton et al., 3,421,901 to Mahlmann et al., 3,532,507 to Cascione and 3,615,665 to White et al., and the vacuum-distilled aromas obtained from roasted and ground coffee as described in U.S. Pat. No. 2,680,687 to Lemonnier and 3,035,922 to Mook et al. It would, of course, also be possible to employ volatile synthetic chemical compounds which duplicate or simulate the aromatic compounds naturally present in roasted coffee, fermented tea or other aromatic food products.

The aromas absorbed onto the microporous particles in accordance with this invention have been found to be stable during prolonged storage under inert conditions such as that normally existing in packaged soluble coffee products. These absorbed aromas are able to produce desirable headspace aroma in packaged products and if present in sufficient quantity can also produce desirable flavor effects.

EXAMPLE 1

An aqueous coffee extract having a soluble solids content of 33% by weight was prepared by reconstituting spray dried coffee solids. This extract was sprayed into a open vessel containing liquid nitrogen whereupon the particles of extract immediately froze and were dispersed. The extract was sprayed by means of a two-fluid, glass atomizing nozzle (a chromatographic nozzle obtained from SGA Scientific, Inc.) using air as the pressurizing fluid. The liquid nitrogen and particle mixture was poured into freeze drier trays and the liquid nitrogen was allowed to boil-off leaving behind a flat bed of frozen particles about 1/16 to ⅛ inches in thickness. The trays were placed in a freeze drier and subject to a vacuum of 10 microns of Hg. and a plate temperature of 50° C. for a period of 18 hours. The vacuum on the freeze drier was broken with dry $CO_2$ and the dry particles having a moisture content of below about 1.5% were removed from the freeze drier and kept out of contact of moisture. The dry particles were found to have a microporous structure containing pores having a most probable radius of about 24–28 Å and a screen analysis as follows:

| Standard U.S. Mesh # | % Wt. |
| --- | --- |
| on 80 | 7.5 |
| on 100 | 15.0 |
| on 200 | 67.3 |
| pan | 10.2 |

The dry particles were subsequently chilled in dry ice under a dry atmosphere and mixed with coffee grinder gas frost, having a moisture content between 10 and 15% by weight, at a weight ratio of 0.2 parts frost per part particle. The mixture was transferred to a pre-chilled jar having a pinhole vent and the jar was stored at 0° F. overnight during which time $CO_2$ was evolved. The chilled particles, having a moisture content of below 6% by weight, were then packaged in glass jars with unplated, agglomerated spray dried coffee solids at the level of 0.75% by weight of spray dried solids. The resulting jars were then stored at 95° F. for periods of eight weeks. Upon initial opening and during a standard 7 day in-use cycle, a pleasing headspace aroma is found which is rated as being at least as good as the headspace aroma possessed by jars of comparably stored aromatized, agglomerated spray-dried coffee which coffee had been plated with grinder gas-enriched coffee oil. This oil-plated sample was prepared in accordance with U.S. Pat. No. 4,119,736 to Howland et al using an amount of grinder gas frost for each weight unit of soluble product comparable to that employed in the inventive sample.

EXAMPLE 2

One hundred milliliters of a coffee extract containing 50% by weight soluble solids is sprayed by means of a glass chromatographic nozzle into a large beaker containing one gallon of pure ethanol. The ethanol was at room temperature and was stirred during the spraying operation. Thereafter particles of soluble coffee were filtered from the ethanol and these particles were put in a vacuum oven (25 inches Hg. vacuum and about 90° C.) overnight to remove residual ethanol. The resulting particles were found to have a microporous structure wherein the most probable pore radius was 33 Å. The particles were kept out of contact with moisture and contacted with grinder gas frost at a level by weight of 2 parts frost to 1 part of particles in a Parr bomb heated to about 20° C. The resulting aromatized particles were combined and packaged with unplated and unaromatized spray dried coffee agglomerate at a level of about 0.5% by weight. The jar aroma possessed by this sample after one week storage at room temperature was found to be comparable to week-old, grinder gas-enriched, oil-plated agglomerate.

EXAMPLE 3

Agglomerated spray dried coffee was ground and the particles passing through a 50 mesh (U.S. Standard Sieve) screen were separated and 150 grams of these particles were added to 2000 ml. of 100% ethanol. This mixture was boiled for 24 hours in a steam jacketed vessel equipped with an overhead reflux condenser and a stirring rod. Thereafter the coffee particles were filtered from the ethanol and dried in a vacuum for 24 hours at 80° C. and a vacuum of about 630 mm of Hg. The dry particles weighed a total of about 90 grams (about 60 grams of coffee solids having been dissolved by the ethanol) and possessed a porous structure wherein the most probable pore radius was about 102 Å. Two parts (by weight) of these particles were contacted with one part of grinder gas frost in the manner set forth in Example 1 and the resulting aromatized particles were packaged with agglomerated spray dried coffee at a level of about 0.5% by weight. The jar aroma possessed by this sample after one week storage at room temperature was found to be comparable to week-old, grinder gas-enriched, oil-plated agglomerate.

As previously noted, jar aroma has been provided to commercial soluble coffee products by means of oil plating an aroma-bearing glyceride (e.g. coffee oil) onto soluble powder. It has also been contemplated to absorb coffee aromatics onto oil plated soluble coffee and this technique is expressly disclosed in U.S. Pat. No. 3,823,241 to Patel et al. It has, however, not previously been thought possible to absorb or adsorb high levels of aromatics directly onto soluble coffee solids such that the aromatics would be retained. The Patel et al. patent notes the criticality of the oil so that upon successive openings of the soluble coffee package (i.e., in-use cycle) the consumer will continue to perceive a jar aroma. This is in fact the situation for the conventional spray-dried, foam-dried and freeze-dried products dealt with in the Patel et al. patent. However, the same deficiency does not exist in porous soluble coffee particles having a most probable pore radius of less than 150 Å. As previously noted, conventional spray dried coffee does not possess a microporous structure; while in conventional freeze dried coffee, the most probable pore radius is on the order of 10,000 Å.

As will be seen in the following Table which compares the rate at which aroma is released from aromatized particles of soluble coffee of Examples 1 to 3 as compared to aromatized particles of spray dried coffee which had been reduced to a comparable particle size by being ground with dry ice. The aroma release characteristics of the different aromatized soluble coffee substrates can be predicted by observing the amount of organic carbon (micrograms) that was swept from the substrate as a function of sweeping time. The carbon values were obtained by sweeping a known weight of coffee (0.5 gms) with a stream of nitrogen (30 cc/min) at 30° C. for 2000 seconds. The volatiles removed were recorded every 200 seconds. The Table shows the rate (expressed as % of total) of aroma release (cumulative) as a function of sweep time, the aroma released in 2000 seconds is taken as equal to 100%.

TABLE 1

| Sweep Time (seconds) | % Aroma Released $\frac{(\mu gm\ carbon/gm\ coffee)\ in\ respective\ sweep\ time}{(\mu gm\ carbon/gm\ coffee)\ in\ 2000\ seconds} \times 100$ | | | |
|---|---|---|---|---|
| | Example 1 | Example 2 | Example 3 | Control |
| 200 | 51 | 36 | 55 | 69 |
| 400 | 74 | 56 | 74 | 87 |
| 600 | 82 | 67 | 82 | 94 |
| 800 | 88 | 76 | 87 | 96 |
| 1000 | 92 | 82 | 91 | 97 |
| 1200 | 94 | 87 | 93 | 98 |
| 1400 | 97 | 91 | 96 | 98 |
| 1600 | 98 | 94 | 97 | 99 |
| 1800 | 99 | 97 | 98 | 99 |
| 2000 | 100 | 100 | 100 | 100 |

As can be seen from the Table 1, the spray dried control material, which does not possess a microporous structure, gives up aroma most rapidly and then would not be as suitable for providing an in-use jar aroma.

EXAMPLE 4

A series of porous particles were made according to the following procedures: (1) Spray dried, agglomerated coffee powder was reconstituted to 33% soluble solids and this extract was sprayed into liquid nitrogen using a glass chromatographic nozzle. The resulting frozen particles were freeze dried at 10 mm microns of Hg. and 25° C. for 16 hours. Particles in excess of 50 mesh (U.S. Standard Sieve) were screened out. (2) Same as in 1 but powder reconstituted to 50% soluble solids. (3) Spray dried, agglomerated coffee powder was reconstituted to 33% soluble solids and sprayed into 100% ethanol. The resulting particles were collected and placed in a vacuum drier at 100° C. and 25 inches Hg. vacuum for 16 hours. (4) 300 grams of the spray dried agglomerate was ground and boiled in 2000 ml of 100% ethanol. The resulting particles were dried at about 90° C. and 25 inches Hg. vacuum for 16 hours. A portion of each of the four samples was aromatized by contact with grinder gas frost at a ratio (by weight) of 0.4 parts frost per part substrate. Contact was effected by mixing the frost and substrate together in a vessel chilled with dry ice. The aroma-bearing particles were placed in separate chilled jars equipped with a vent and placed in a 0° F. freezer overnight. Thereafter 0.2 grams of each aromatized sample was placed in a stoppered 250 cc flask and 1 cc of the resulting headspace aroma contained in the flasks was then evaluated using standard carbon gas chromatographic techniques. A portion of each of the aroma-bearing particles was also subjected to the previously identified nitrogen sweep test (2000 seconds at 30° C.) to assess the level of aromatics contained therein. This nitrogen sweep test was also performed on the unaromatized samples. The results of these evaluations are set forth in Table 2.

TABLE 2

| Sample # | Porosity (Å) | Aroma Released ($4\mu$ gm carbon/ gm coffee) | Headspace (GC counts in millions) |
|---|---|---|---|
| 1 | 23–28 | 28.5 | |
| 1-aromatized | 23–28 | 1790 | 1.375 |
| 2 | above 140 | 6.75 | |
| 2-aromatized | above 140 | 458 | .304 |
| 3 | 33 | 2.11 | |
| 3-aromatized | 33 | 2055 | .847 |
| 4 | 100 | 3.06 | |
| 4-aromatized | 100 | 723 | .448 |

Table 2 evidences the quantity of aroma which can be absorbed by the porous particles of this invention as compared to the amount of aroma present in the unaromatized particles as well as the ability of these particles to produce a headspace aroma comparable in quantity to the headspace aroma produced by the grinder gas-enriched coffee oil produced in accordance with the aforementioned Howland et al patent.

Having thus described the invention, what is claimed is:

1. A method for producing aroma loaded microporous particles of vegetable material which comprises spraying an aqueous solution of said vegetable material into an anhydrous organic solvent which will dehydrate the solution and form microporous particles of soluble solids having an average particle size of less than 200 microns in diameter, thereafter separating the particles from the water-containing solvent and removing residual solvent and then loading the microporous particles with volatile aromatics.

2. The method of claim 1 wherein the solvent is 100% ethanol.

3. The method of claims 1 or 2 wherein the residual solvent is removed by vacuum drying.

4. The method of claims 1 or 2 wherein the particles are separated from the solvent by filtration.

5. The method of claim 1 wherein the microporous, aroma-loaded particles are packaged with a soluble food powder in order to effect an in-use headspace aroma in the packaged product.

6. The method of claim 5 wherein the aroma-loaded particles are dry-blended with the soluble food powder.

* * * * *